(12) United States Patent
Khaire et al.

(10) Patent No.: US 11,971,254 B2
(45) Date of Patent: Apr. 30, 2024

(54) MECHANICAL SYSTEM COMPRISING A SENSOR BEARING UNIT AND ASSOCIATED MOUNTING METHOD

(71) Applicant: AKTIEBOLAGET SKF, Gothenburg (SE)

(72) Inventors: Maruti Vitthal Khaire, Pune (IN); Manoj M Babu, Hosur (IN)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/740,532

(22) Filed: May 10, 2022

(65) Prior Publication Data

US 2022/0364845 A1 Nov. 17, 2022

(30) Foreign Application Priority Data

May 17, 2021 (IN) .............................. 202141022136

(51) Int. Cl.
  *G01B 7/30* (2006.01)
  *G01D 5/20* (2006.01)
(52) U.S. Cl.
  CPC ................ *G01B 7/30* (2013.01); *G01D 5/20* (2013.01)

(58) Field of Classification Search
  CPC .......... G01D 5/20; G01D 5/2073; G01B 7/30
  See application file for complete search history.

(56) References Cited

U.S. PATENT DOCUMENTS

| 6,231,241 | B1 | 5/2001 | Ohkuma |
| 2002/0030482 | A1* | 3/2002 | Iwamoto ................. G01P 3/443 324/174 |
| 2021/0372827 | A1* | 12/2021 | Loecklin .............. G01D 5/3473 |

FOREIGN PATENT DOCUMENTS

| FR | 2301014 A1 | 9/1976 |
| JP | 2008190687 A * | 8/2008 |
| WO | 2009004198 A1 | 1/2009 |
| WO | WO-2009004198 A1 * | 1/2009 ............ F16C 41/007 |

* cited by examiner

*Primary Examiner* — Akm Zakaria
(74) *Attorney, Agent, or Firm* — J-TEK LAW PLLC; Scott T. Wakeman; Mark A. Ussai

(57) ABSTRACT

A mechanical system includes a sensor bearing unit and a fixed support part. The sensor bearing unit includes a bearing including a first ring and a second ring centered on an axis, an impulse ring secured to the first ring of the bearing, and a sensor device for detecting rotational parameters of the impulse ring. The sensor device has a sensor housing secured to the second ring of the bearing and a cable output that extends radially and is located circumferentially two spaced protrusions of the fixed support part.

20 Claims, 8 Drawing Sheets

MECHANICAL SYSTEM COMPRISING A SENSOR BEARING UNIT AND ASSOCIATED MOUNTING METHOD

CROSS-REFERENCE

This application claims priority to Indian patent application no. 202141022136 filed on May 17, 2021, the contents of which are fully incorporated herein by reference.

TECHNOLOGICAL FIELD

The present disclosure relates to a mechanical system comprising a sensor bearing unit comprising a bearing, an impulse ring and a sensor device.

BACKGROUND

Today, sensor bearing units are commonly used in a wide range of technical fields, for example in the automotive industry and aeronautics. These units provide high quality signals and transmissions, while allowing integration in simpler and more compact apparatus.

A sensor bearing unit generally comprises a bearing, an impulse ring secured to the rotatable ring of the bearing, and a sensor unit or device for sensing the angular position of the impulse ring with respect to the fixed ring of the bearing.

Conventionally, the impulse ring is provided with a target holder secured onto the rotatable inner ring and with a magnetic target secured to the target holder. The sensor device is provided with a sensor element facing the magnetic target of the impulse ring in order to determine, on the basis of the magnetic field variations, the angular position of the rotatable ring.

The sensor device is provided with a sensor housing supporting the sensor element and secured to the fixed outer ring of the bearing. To this end, the sensor device may be further provided with a metallic support secured into a groove formed on the bore of the outer fixed ring and inside which is mounted the sensor housing. For more details, it is possible for example to refer to the patent application WO 2009/004198.

During the mounting of the sensor bearing unit in the associated apparatus, such solution requires a mechanical angular positioning of the sensor housing inside the metallic support, and then a plastic deformation of this support to block rotation of the sensor housing.

SUMMARY

One aim of the present disclosure is to overcome this drawback.

The disclosure relates to a mechanical system comprising a sensor bearing unit and a fixed support part. The sensor bearing unit comprises a bearing including a first ring and a second ring centered on an axis, an impulse ring secured to the first ring of the bearing, and a sensor device for detecting rotational parameters of the impulse ring comprising a sensor housing secured to the second ring of the bearing and provided with a cable output.

According to a first general feature, the cable output of the sensor housing of the sensor device extends radially.

According to a second general feature, the cable output is located circumferentially between two spaced protrusions of the fixed support part.

With such a design, position of the cable output of the sensor housing of the sensor device is predetermined and locked in the circumferential direction. The cable output of the sensor housing and the protrusions of the non-rotating support part form an anti-rotation means of the sensor housing and the second ring of the bearing.

This design does not require a plastic deformation of a part of the mechanical system to angularly secure the sensor housing of the sensor device.

In one embodiment, the protrusions of the fixed support part extend at least axially.

Preferably, a circumferential clearance is provided between each protrusion of the fixed support part and the cable output of the sensor housing of the sensor device of the sensor bearing unit.

This facilitates the mounting of the cable output between the two facing protrusions of the fixed support part.

In one embodiment, the cable output of sensor housing of the sensor device of the sensor bearing unit protrudes radially outwards with respect to the outer surface of the sensor housing.

The sensor device of the sensor bearing unit may further comprise at least one sensor element supported by the sensor housing and cooperating with the impulse ring, and one cable engaged inside the cable output of the sensor housing and connected to the sensor element.

In one embodiment, the sensor element of the sensor device axially faces the impulse ring. Alternatively, the sensor element may radially face the impulse ring.

In one embodiment, the impulse ring is made of metal and provided with alternating teeth and apertures and the sensor element of the sensor device is configured to sense the metal impulse ring teeth and apertures.

The sensor element may directly face the impulse ring, or indirectly cooperate with the impulse ring, i.e. with interposition of an element axially between the impulse ring and the sensor element.

In one embodiment, the sensor housing of the sensor device of the sensor bearing unit comprises an annular outer axial portion, and annular inner axial portion and an annular radial portion extending between the outer and inner axial portions. The cable output protrudes radially outwards with respect to the outer axial portion of the sensor housing.

In one embodiment, the sensor housing may be secured into a groove formed on a cylindrical surface of the second ring of the bearing which is located radially on the side opposite to the first ring.

With such design, the sensor housing is not secured on a cylindrical surface of the first or second ring which radially faces the second or first ring, and is not located radially between the first and second rings. Therefore, if necessary, the bearing may be provided with seals each secured into a groove formed on a cylindrical surface of the first or second ring which radially faces the second or first ring. The seals may be radially disposed between the first and second rings.

The sensor housing of the sensor device may be provided with a snapping portion engaged partly inside the groove of the second ring.

In one embodiment, the cylindrical surface of the second ring of the bearing has a stepped shape with a first cylindrical portion and with a second cylindrical portion radially offset towards the first ring with respect to the first cylindrical portion, the groove being axially located between the first and second cylindrical portions.

With such embodiment, the snapping portion of the sensor housing of the sensor device may be radially offset towards the first ring of the bearing with respect to the first cylindrical portion of the cylindrical surface or being flush with the first cylindrical portion.

Accordingly, the snapping portion of the sensor housing of the sensor does not protrude radially with respect to the cylindrical surface of the second ring. The radial boundary dimension of the bearing is unchanged.

In a second alternative embodiment, the cylindrical surface of the second ring of the bearing may be provided with one single diameter.

In one embodiment, the groove is formed on the outer cylindrical surface of the second ring which forms the outer ring of the bearing. Alternatively, the groove may be formed on the inner cylindrical bore of the second ring which forms the inner ring of the bearing.

In another aspect, a mechanical system includes a fixed support part having an opening and two circumferentially spaced protrusions adjacent to the opening and a sensor bearing unit. The sensor bearing unit includes a bearing having a first ring and a second ring centered on an axis, an impulse ring secured to the first ring of the bearing, and a sensor device for detecting rotational parameters of the impulse ring. The sensor device includes a sensor housing secured to the second ring of the bearing and a sensor element supported in an interior of the sensor housing, and the sensor housing includes a cylindrical outer surface and a hollow boss outside the opening extending radially, relative to the axis, from the cylindrical outer surface between the two circumferentially spaced protrusions.

The disclosure further relates to a method for mounting a sensor bearing unit in a mechanical system as previously defined, wherein the method comprises at least the following step:
fastening the sensor bearing unit to the fixed support part with the cable output of the sensor housing of the sensor device fitted between the two spaced protrusions of the fixed support part.

BRIEF DESCRIPTION OF THE DRAWINGS

The present invention and its advantages will be better understood by studying the detailed description of a specific embodiment given by way of a non-limiting example and illustrated by the appended drawings on which.

DETAILED DESCRIPTION

Figure 1:
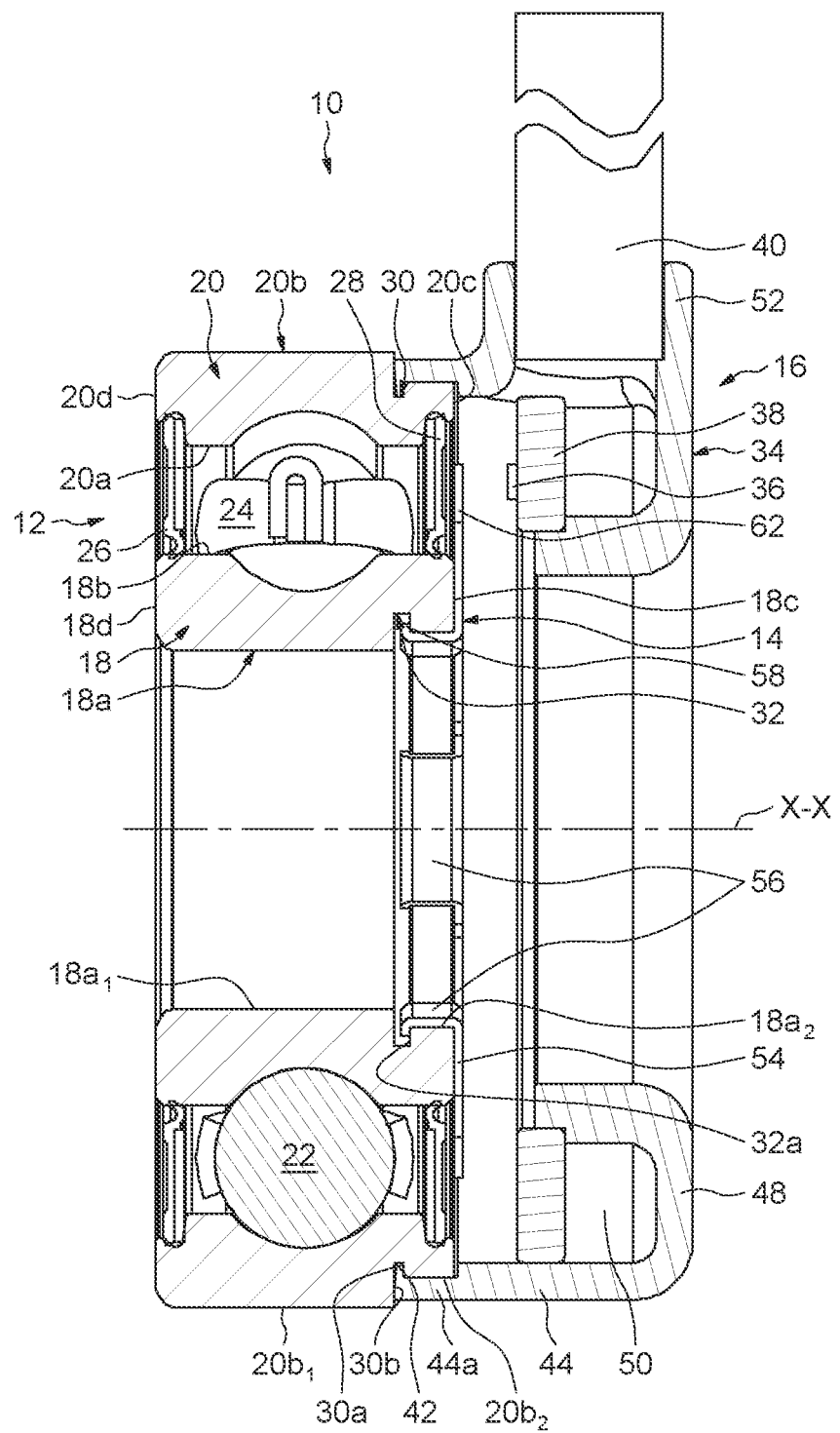
FIG. 1 is an axial section view of a sensor bearing unit according to an example of the disclosure.

The sensor bearing unit 10 represented in FIG. 1 is adapted to equip a mechanical system such as a motor, a brake system, a suspension system or any rotating machine, in particular for an automotive vehicle or a two-wheeled vehicle.

Figure 9:
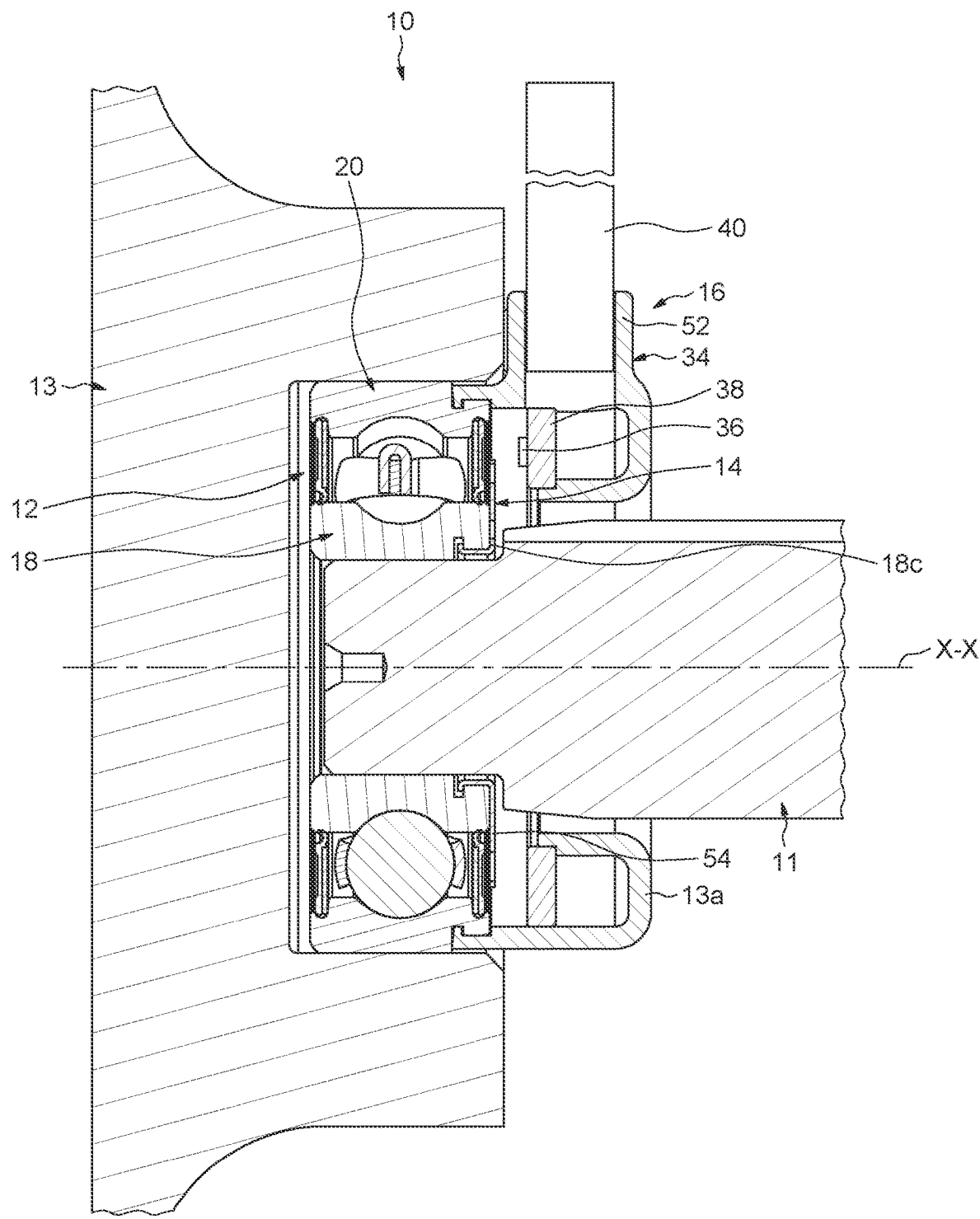
FIG. 9 is a partial axial section view of a mechanical system provided with the sensor bearing unit of FIG. 1.
Figure 10:
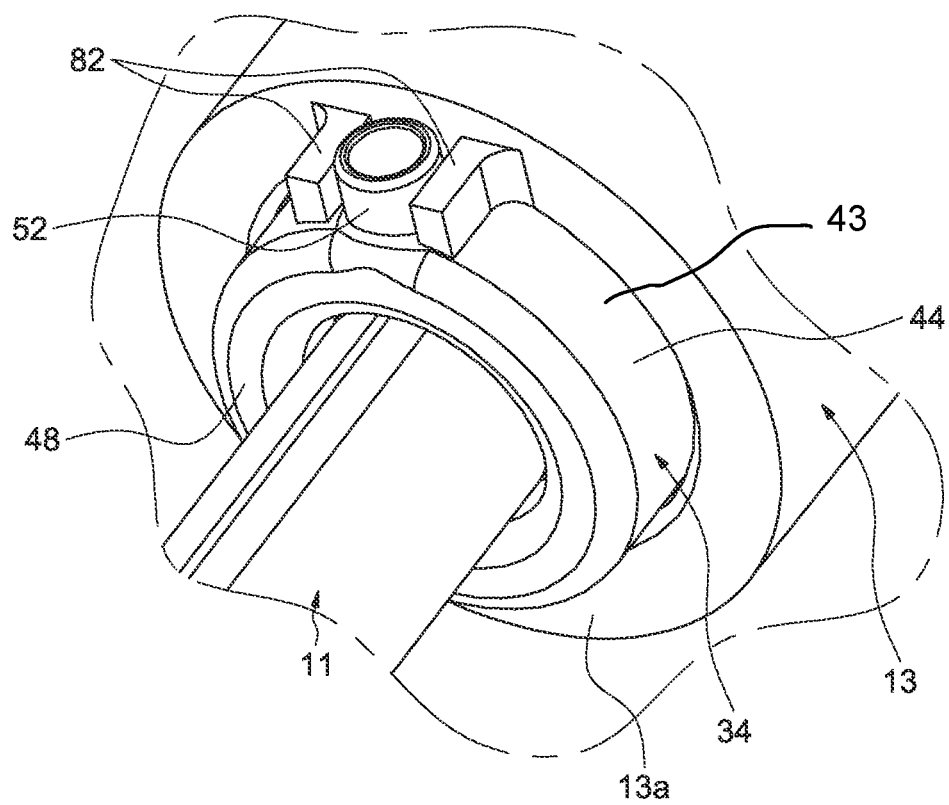
FIG. 10 is a partial perspective view of the mechanical system of FIG. 10.

Such a mechanical system is shown partially in FIGS. 9 and 10 and is provided with a rotating shaft 11 and a non-rotating or fixed casing 13. If the mechanical system is an electric motor, a rotor is secured to the shaft 11 and a stator is secured to the casing 13. The sensor bearing unit 10 is mounted on the shaft 11 and in the casing 13. The sensor bearing unit 10 may be received into a shield of the casing 13. Alternatively, the sensor bearing unit 10 may be received into the bore of the casing 13.

As shown in FIG. 1, the sensor bearing unit 10 comprises a bearing 12 and an impulse ring 14 and a sensor device 16 mounted on the bearing. The bearing 12 is intended to be mounted on the shaft 11 (FIGS. 9 and 10) of the mechanical system for tracking the rotation of the shaft.

The bearing 12 comprises a first ring 18 and a second ring 20. In the illustrated example, the first ring 18 is the inner ring whereas the second ring 20 is the outer ring. The inner and outer rings 18, 20 are concentric and extend axially along the bearing rotation axis X-X' which runs in an axial direction. The outer ring 20 radially surrounds the inner ring 18. The inner and outer rings 18, 20 are made of steel.

As will be described later, the impulse ring 14 is secured to the inner ring 18 and the sensor device 16 is secured to the outer ring 20.

In the illustrated example, the bearing 12 also comprises a row of rolling elements 22, which are provided here in the form of balls, interposed between raceways (not referenced) formed on the inner and outer rings 18, 20.

The bearing 10 also comprises a cage 24 for maintaining the regular circumferential spacing of the rolling elements 20. The bearing 10 further comprises seals 26, 28 radially disposed between the inner and outer rings 18, 20 to define a closed space inside which the rolling elements 22 are arranged.

The inner ring 18 of the bearing is mounted on the outer surface of the shaft 11 (FIGS. 9 and 10) of the mechanical system. The inner ring 18 is intended to rotate while the outer ring 20 is intended to be fixed. The outer ring 20 is mounted into a bore of the fixed casing 13 (FIGS. 9 and 10) of the mechanical system.

The outer ring 20 is provided with a cylindrical inner surface or bore 20a and with an outer cylindrical surface 20b which is radially opposite the bore 20a. The outer surface 20b is located radially on the side opposite the inner ring 18. The bore 20a radially faces the inner ring 18. In the illustrated example, a toroidal circular raceway for the rolling elements 22 is formed from the bore 20a, the raceway being directed radially inwards. Two grooves (not referenced) are also formed on the bore 20a into which are secured the seals 26, 28.

The outer ring 20 is also provided with two opposite radial lateral faces 20c, 20d which axially delimit the bore 20a and the outer surface 20b of the ring.

Figure 2:
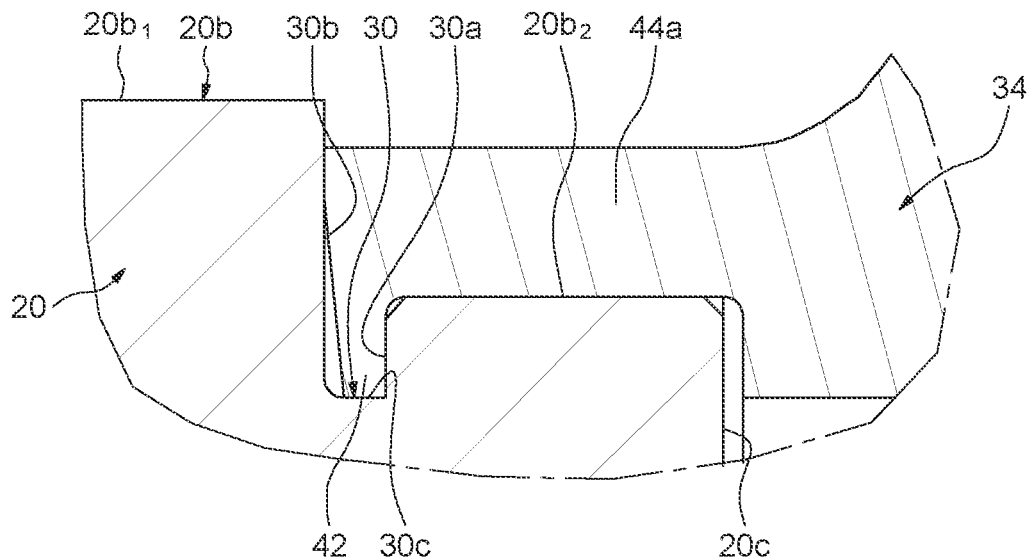
FIGS. 2 and 3 are detail views of FIG. 1.

As shown more clearly in FIG. 2, a groove 30 is formed on the outer surface 20b of the outer ring. The groove 30 is oriented radially outwards, i.e. radially on the side opposite the inner ring. The groove 30 extends radially inwards from the outer surface 20b of the outer ring. In the illustrated example, the groove 30 has an annular form.

The groove 30 is axially delimited by two side walls 30a, 30b. The side walls 30a, 30b axially face each other. The side walls 30a, 30b are axially spaced apart from each other. The groove 30 also comprises a bottom 30c connected to the side walls 30a, 30b. The outer surface 20b of the outer ring and the bottom 30c of the groove are radially offset. The bottom 30c is radially offset inward with regard to the outer surface 20b. The side walls 30a, 30b of the groove extend radially. The bottom 30c extends axially. The groove 30 has a U-shaped cross-section.

In the illustrated example, the outer surface 20b of the outer ring has a stepped shape. The outer surface 20b is provided with a first cylindrical portion $20b_1$ and with a second cylindrical portion $20b_2$ which is radially offset inwards, i.e. towards the inner ring, with respect to the first cylindrical portion $20b_1$. The groove 30 is axially interposed between the first and second cylindrical portions $20b_1$, $20b_2$.

The side wall 30b of the groove axially delimits the first cylindrical portion 20b1. More precisely, the first cylindrical portion 20b1 is axially delimited by the lateral face 20d (FIG. 1) and the side wall 30b. The side wall 30a of the groove axially delimits the second cylindrical portion $20b_2$. More precisely, the second cylindrical portion 20b2 is axially delimited by the lateral face 20c and the side wall 30a.

Referring once again to FIG. 1, similarly to the outer ring 20, the inner ring 18 is provided with a cylindrical inner surface or bore 18a and with an outer cylindrical surface 18b which is radially opposite the bore 18a. The outer surface 18b radially faces the outer ring 20. The bore 18a is located radially on the side opposite to the outer ring 20. In the illustrated example, a toroidal circular raceway for the rolling elements 22 is formed from the outer surface 18b, the raceway being directed radially outwards.

The inner ring 18 is also provided with two opposite radial lateral faces 18c, 18d which axially delimit the bore 18a and the outer surface 18b of the ring.

Figure 3:
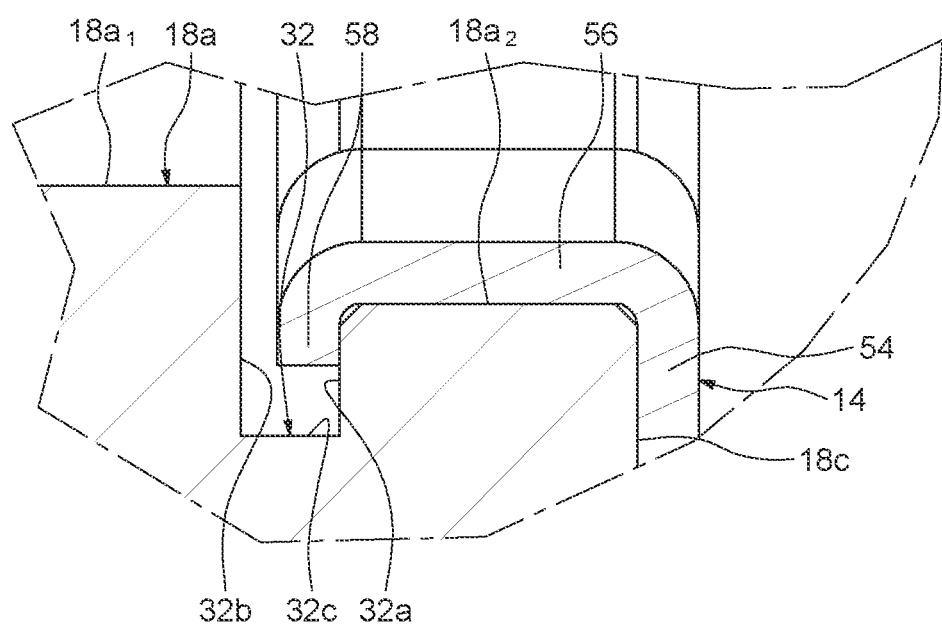
Figure 4:
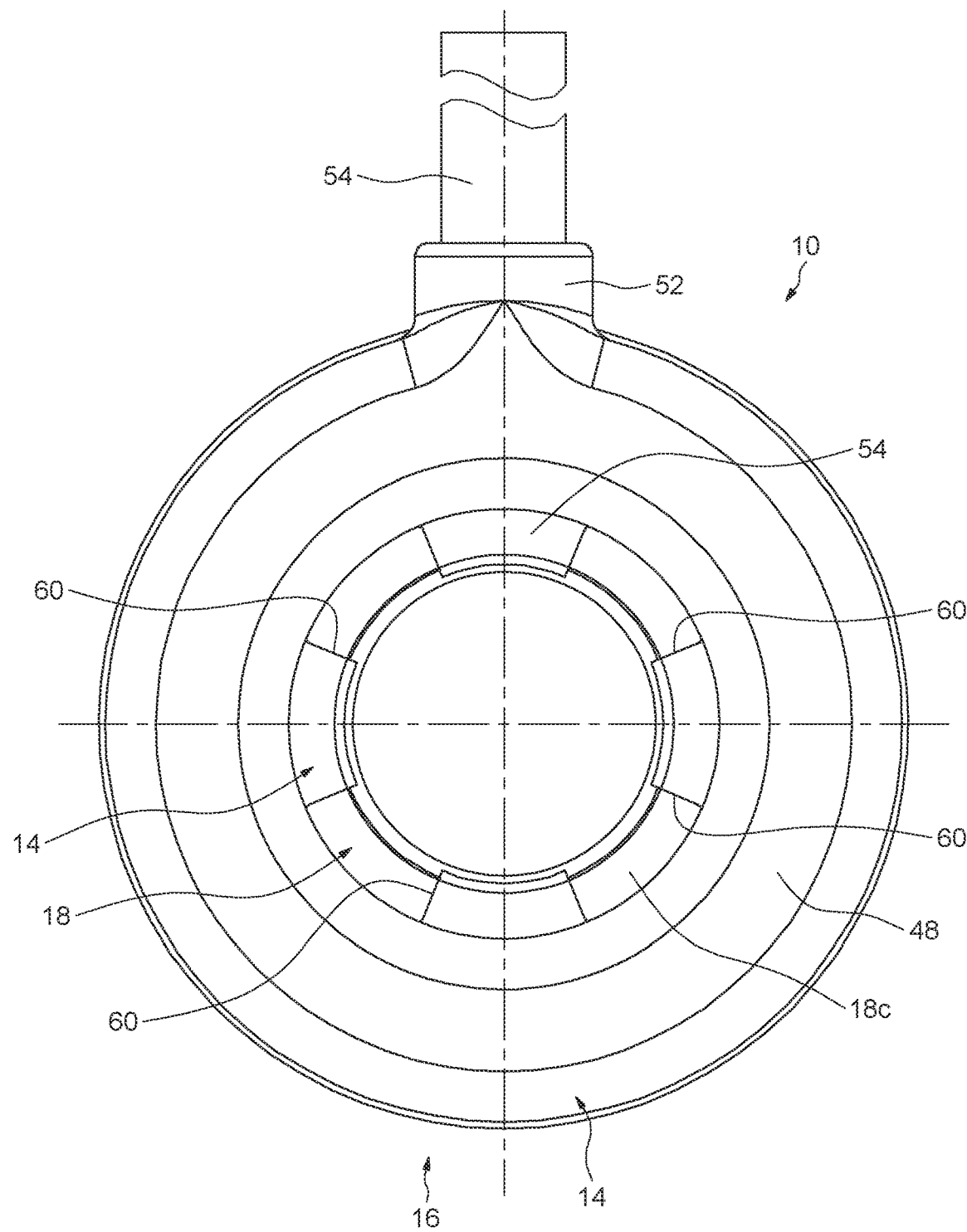
FIG. 4 is a front view of the sensor bearing unit of FIG. 1.

As shown more clearly in FIG. 3, a groove 32 is formed on the bore 18a of the inner ring. The groove 32 is oriented radially inwards, i.e. radially on the side opposite to the outer ring. The groove 32 extends radially outwards from the bore 18a of the inner ring. In the illustrated example, the groove 32 has an annular form.

The groove 32 is axially delimited by two side walls 32a, 32b. The side walls 32a, 32b axially face each other. The side walls 32a, 32b are axially spaced apart from each other. The groove 32 also comprises a bottom 32c connected to the side walls 32a, 32b. The bore 18a of the inner ring and the bottom 32c of the groove are radially offset. The bottom 32c is radially offset outward with regard to the bore 18a. In the illustrated example, the side walls 32a, 32b of the groove extend radially. Alternatively, the side wall 32b may extend obliquely. The bottom 32c extends axially. The groove 32 has here a U-shaped cross-section.

In the illustrated example, the bore 18a of the inner ring has a stepped shape. The bore 18a is provided with a first cylindrical portion $18a_1$ and with a second cylindrical portion 18a2 which is radially offset outwards, i.e. towards the outer ring, with respect to the first cylindrical portion $18a_1$. The groove 32 is axially interposed between the first and second cylindrical portions $18a_1$, $18a_2$.

The side wall 32b of the groove axially delimits the first cylindrical portion $18a_1$. More precisely, the first cylindrical portion $18a_1$ is axially delimited by the lateral face 18d (FIG. 1) and the side wall 32b. The side wall 32a of the groove axially delimits the second cylindrical portion $18a_2$. More precisely, the second cylindrical portion $18a_2$ is axially delimited by the lateral face 18c and the side wall 32a.

Referring once again to FIG. 1 and as previously indicated, the sensor device 16 is secured to the outer ring 20. The sensor device comprises a sensor body or housing 34 and sensor elements 36 (only one being visible in FIG. 1) supported by the sensor housing 34. The sensor device 16 also comprises a printed circuit board 38 secured to the sensor housing 34 and supporting the sensor elements 36. In the illustrated example, the sensor device 16 also comprises a connecting cable 40 for transmitting sensing data.

The sensor housing 34 has an annular form. The sensor housing 34 is secured into the groove 30 formed on the outer surface 20b of the outer ring. The sensor housing 34 is provided with an annular hook 42 engaged inside the groove 30 to axially retain the sensor housing 34 relative to the outer ring. The hook 42 extends radially. The hook 42 axially abuts against the radial side wall 30a of the groove. In the illustrated example, the hook 42 also radially abuts against the bottom 30c of the groove. Alternatively, a slight radial gap may remain between the hook 42 and the bottom 30c.

In the illustrated example, the sensor housing 34 is provided with an annular hook 42. Alternatively, the sensor housing 34 may be provided with a plurality of hooks 42 spaced apart in the circumferential direction, preferably regularly, and each engaged inside the groove 30 of the outer ring.

The sensor housing 34 comprises a radially outer cylindrical surface 43, an annular outer axial portion 44 provided with the hook 42, an annular inner axial portion 46 and an annular radial portion 48 extending between the outer and inner axial portions. The outer and inner axial portions 44, 48 are concentric and coaxial with the axis X-X'.

The outer axial portion 44 of the sensor housing radially surrounds the inner portion 46. The outer axial portion 44 extends axially from the radial portion 48 towards the bearing 12. The outer axial portion 44 extends axially from a large-diameter edge of the radial portion 48.

A part 44a of the outer axial portion 44 radially surrounds the outer surface 20b of the outer ring. The hook 42 extends radially inwards from this part 44a of the outer axial portion 44. The part 44a of the outer portion 44 radially surrounding the outer surface 20b of the outer ring and the hook 42 form together a snapping portion of the sensor housing 34. The part 44a of the outer axial portion radially comes into contact with the outer surface 20b of the outer ring. The part 44a of the outer axial portion radially comes into contact with the second cylindrical portion $20b_2$ of the outer surface. The free end of the outer axial portion 44, namely the free end of the part 44a, axially abuts against the side wall 30b of the groove of the outer ring. The hook 42 is provided at the free end of the outer axial portion 44.

The part 44a of the outer axial portion is radially offset inwards, towards the inner ring 18, with respect to the first cylindrical portion $20b_1$ of the outer surface of the outer ring. In the illustrated example, the outer axial portion 44 is entirely radially offset inwards with respect to the first cylindrical portion $20b_1$.

The outer axial portion 44 of the sensor housing axially protrudes towards the bearing 12 with regard to the inner axial portion 46. The inner axial portion 46 defines the bore of the sensor housing 34. The inner axial portion 46 extends axially from the radial portion 48 towards the bearing 12. The inner axial portion 46 extends axially from a small-diameter edge of the radial portion 48. The inner axial portion 46 remains axially spaced apart from the bearing 12 and the impulse ring 14.

The sensor housing 34 defines an annular space 50 axially oriented towards the bearing 12. The space 50 is radially delimited by the outer and inner axial portions 44, 46. The space 50 is axially delimited by the radial portion 48.

In the illustrated example, the sensor housing 34 also comprises a cable output 52 which extends radially and inside which is engaged the cable 40. The cable output 52 forms a protruding portion extending radially outwards from the outer surface of the sensor housing 34. The cable output 52 protrudes radially outwards from the outer axial portion 44 of the sensor housing. Only the cable output 52 radially protrudes outwards with respect to the outer surface of the sensor housing 34.

In the illustrated example, the cable output 52 has a tubular form as shown, for example, in FIG. 10. Alternatively, the cable output 52 may have other shapes, for example a rectangular parallelepiped form. The cable output 52 may be described as a "hollow boss." The cable 40 protrudes outwards from the cable output 52. The cable 40 is secured into the cable output 52 by any appropriate means, for example by press-fitting or gluing. The cable 40 comprises several electrical wires (not shown) connected to the printed circuit board 38. The cable 40 is connected to the sensor elements 36 by the printed circuit board 38.

The sensor body 34 is made in one part. The sensor body 30 is made of a synthetic material. For example, the sensor body 34 may be made of Nylon 66 (PA 6.6) or Polybutylene terephthalate (PBT). Alternatively, the sensor body 34 can also be made from other materials, for example steel.

The printed circuit board 38 is secured to the sensor housing 34. The printed circuit board 38 is housed inside the space 50 defined by the sensor housing 34. In the illustrated example, the printed circuit board 38 is secured to the inner axial portion 46 of the sensor body. Alternatively, the printed circuit board 38 may be secured to the outer axial portion 44 of the sensor body.

The sensor elements 36 are supported by the printed circuit board 38 which is itself supported by the sensor housing 34. As will be described later, the sensor elements 36 are mounted on the printed circuit board 38 axially on the side of the impulse ring 14.

As previously mentioned, the impulse ring 14 is secured to the inner ring 18. The impulse ring 14 is secured into the bore 18a of the inner ring. The impulse ring 14 is secured into the groove 32 formed on the bore 18a. In the disclosed example, the impulse ring 14 is made in one part. The impulse ring 14 is made of metal.

Figure 5:
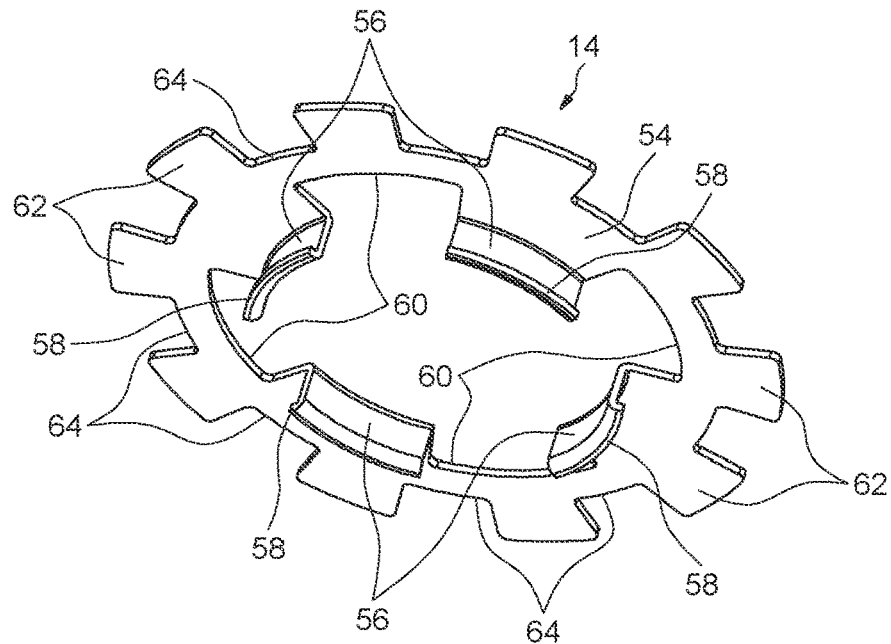
FIG. 5 is a perspective view of an impulse ring of the sensor bearing unit of FIG. 1.
Figure 6:
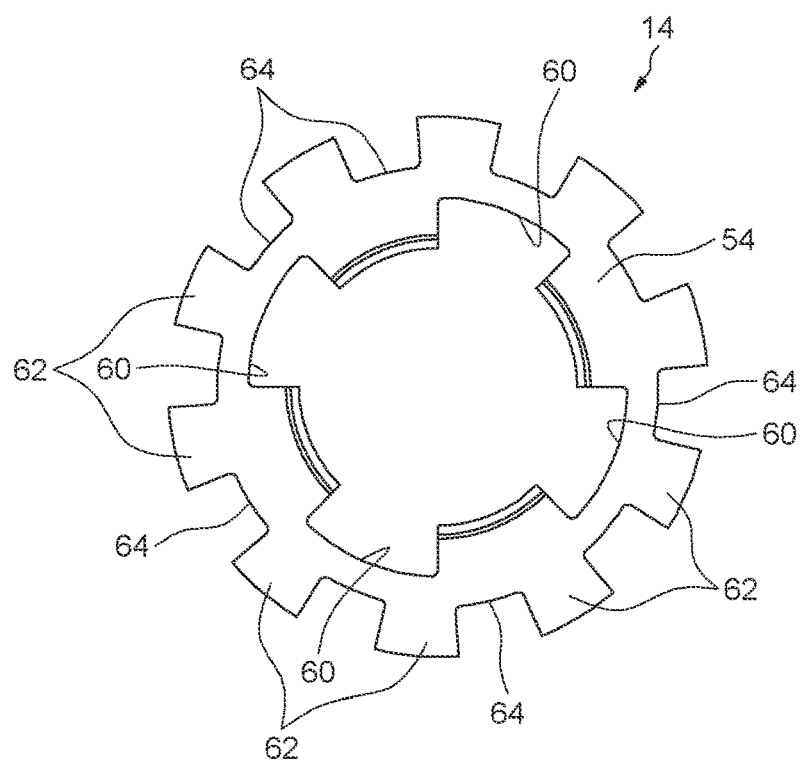
FIG. 6 is a front view of the impulse ring of FIG. 5.

As shown in FIGS. 1, 5 and 6, the impulse ring 14 comprises an annular radial portion 54, and a plurality of inner axial lugs 56 extending axially from the radial portion 54. The lugs 56 extend axially inwards the radial portion 54. The lugs 56 extend axially a small-diameter edge of the radial portion 54. The lugs 56 are spaced apart in the circumferential direction, here regularly. The lugs 56 are here identical one to another. In the illustrated example, four lugs 56 are provided. Alternatively, a different number of lugs 56 may be foreseen, for example at least two lugs. For example, each lug 56 may extend over an angular sector comprised between 35° and 55°, and preferably be equal to 45°.

In the illustrated example, the impulse ring 14 is axially mounted against the lateral face 18c of the inner ring. The radial portion 54 of the impulse ring axially abuts the lateral face 18c. The lugs 56 are mounted into the bore 18a of the inner ring. The lugs 56 radially come into contact with the bore 18a. The lugs 56 radially come into contact with the second cylindrical portion 18a2 of the bore.

Each lug 56 is provided with a hook 58 extending radially and engaged inside the groove 32 to axially retain the impulse ring 14 relative to the inner ring 18. Each hook 58 extends radially outwards from the associated lug 56. Each hook 58 axially abuts against the radial side wall 32a of the groove. Each hook 58 is provided at the free end of the associated lug 56. Each hook 58 and the associated lug 56 have an L-shape in cross-section. The lugs 56 and the hooks 58 form together a snapping portion of the impulse ring 14.

As previously mentioned, in the illustrated example, the impulse ring 14 is provided with a plurality of axial lugs 56. Alternatively, the impulse ring 14 may be provided with an annular axial portion extending axially from the radial portion 54, and with the hooks 58 or with an annular hook engaged inside the groove 32 of the inner ring. In such case, the annular axial portion and the hooks 58, or the annular hook, form together the snapping portion of the impulse ring 14.

In the illustrated example, the impulse ring 14 is provided with a plurality of through-openings 60 formed on the radial portion 54. The openings 60 extend through the axial thickness of the radial portion 54. The openings 60 are spaced apart in the circumferential direction, here regularly. The openings 60 are here identical one to another. In the illustrated example, four openings 60 are provided. Alternatively, a different number of openings 60 may be foreseen, for example only one opening, or at least two openings 60. For example, each opening 60 may extend over an angular sector of from 35° to 55°, and preferably be equal to 45°. In the illustrated example, each through-opening 60 is circumferentially disposed between two successive lugs 56 while being radially offset outwards. Each through-opening 60 opens radially inwards.

Each through-opening 60 is formed on the radial portion 54 such that a part of the lateral face 18c of the inner ring is axially accessible from the outside through the opening 60. In other words, each opening 60 of the radial portion 54 leaves exposed a part of the lateral face 18c of the inner ring.

Each through-opening 60 is formed on the radial portion 54 of the impulse ring to be radially located between the bore 18a and the outer surface 18b of the inner ring. Each through-opening 60 is radially offset outwards with respect to the bore 18a and radially offset inwards with respect to the outer surface 18b. The inner diameter of each through-opening 60 is larger than the diameter of the bore 18a, and its outer diameter is smaller than the diameter the outer surface 18b.

The impulse ring 14 is also provided with a plurality of teeth 62 at its periphery. The teeth 62 are regularly spaced apart in the circumferential direction. A recess or aperture 64 is provided between each pair of successive teeth 62. Hence, the impulse ring 14 is provided with alternating teeth 62 and apertures 64.

As previously mentioned, each sensor element 36 is mounted on the printed circuit board 38 axially on the side of the impulse ring 14. Each sensor element 36 axially faces the impulse ring 14. The sensor elements 36 are disposed on the same diameter on the printed circuit board 38. Each sensor element 36 axially faces one of the teeth 62 or apertures 64 of the impulse ring. The sensor elements 36 are regularly spaced apart in the circumferential direction. For example, the sensor device 16 may comprise three sensor elements 36. Alternatively, a different number of sensor elements 36 may be foreseen, for example one or two sensor elements 36 or at least four sensor elements 36.

Preferably, the sensor elements 36 use induction technology. Each sensor element 36 may include an inductive switch sensor such as a sensing coil. The switch of each sensor element 36 is triggered by the metal impulse ring 14. The teeth 62 and apertures 64 of the impulse ring are used as differential inductance field references.

As an alternative, the impulse ring 14 and the sensors element 36 may use any other suitable technology instead of induction technology. For example, optical technology or magnetic technology may be implemented. In case of magnetic technology, the impulse ring 14 may include alternating North and South poles and the sensor elements 36 may include Hall-effect sensors.

Figure 7:
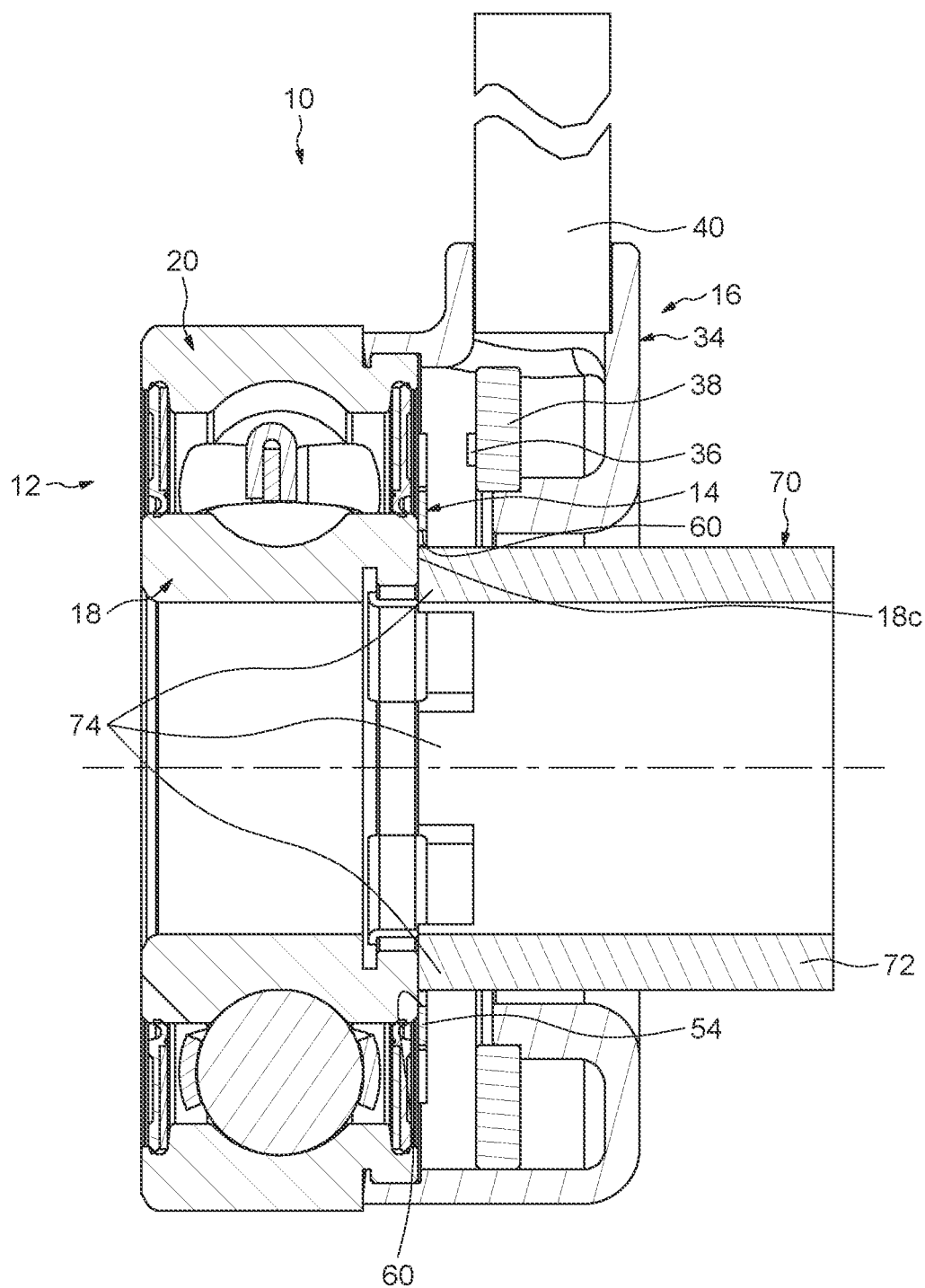
FIG. 7 is an axial view of the sensor bearing unit of FIG. 1 and a mounting tool.
Figure 8:
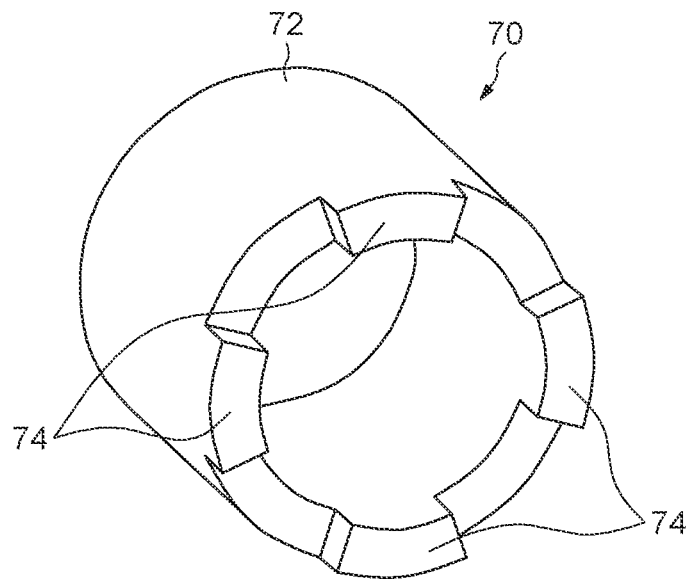
FIG. 8 is a perspective view of the mounting tool of FIG. 7.

As previously mentioned, the bearing 12 is intended to be mounted inside a non-rotating member such as the casing 13 (FIGS. 9 and 10) of the associated mechanical system. To this end, a mounting tool 70 as shown in FIGS. 7 and 8 may be used.

The tool 70 comprises an annular gripping portion 72 and a plurality of axial teeth 74 extending axially at one end of the gripping portion 72. The teeth 74 are spaced apart in the circumferential direction. Here, the teeth 74 are identical one to another. The number of teeth 74 of the tool is equal to the number of through-openings 60 of the impulse ring. The angular dimension of each tooth 74 is smaller than the one of the through-openings 60. Each tooth 74 is configured to be engaged into one of the through-openings 60 of the impulse ring 14 without contact with the impulse ring 14.

The assembly of the sensor bearing unit 10 inside the casing of the mechanical system is done with the tool 70.

Firstly, the tool 70 is positioned such that each tooth 74 extends through one of the openings 60 of the impulse ring and axially come into contact with the lateral face 18c of the inner ring of the bearing. The through-openings 60 of the impulse ring allow the passage of the teeth 74 of the tool to axially abut directly on the lateral face 18c as shown in FIG. 7.

The tool 70 is partly located inside the bore of the sensor housing 34 of the sensor bearing unit 10. The axial contact between the teeth 74 of the tool and the lateral face 18c of the inner ring is the only contact between the tool 70 and the sensor bearing unit 10. There is no contact between the tool 70 and the impulse ring 14, or between the tool and the sensor housing 34.

Secondly, an axial force is exerted directly onto the lateral face 18c of the inner ring of the bearing with the aid of the tool 70 in order to mount into the casing the outer ring 20 of the bearing. Preferably, the outer ring 20 is press-fitted into the casing. The through-openings 60 of the impulse ring enable the tool 70 to axially push directly on the inner ring 18 of the bearing during the installation of the sensor bearing unit 10 into the casing.

Once the assembly of the sensor bearing unit 10 inside the casing 13 of the mechanical system is achieved, the shaft 11 is mounted inside the bore of the inner ring 18 of the bearing.

In an alternative embodiment, it could be possible to mount the bearing 12 of the sensor bearing unit onto the shaft 11 of the mechanical system, and then to introduce the bearing 12 inside the casing 13. In this case, it is possible to not foresee the through-openings 60 of the impulse ring.

As shown in FIGS. 9 and 10, in the mounted position of the bearing 12 inside the fixed casing 13, the sensor housing 34 of the sensor device axially protrudes outwards with respect to the casing. The sensor housing 34 axially protrudes outwards with respect to a frontal face 13a of the casing. The cable output 52 of the sensor housing is axially located outside of the casing 13.

The bearing 12 is mounted inside the fixed casing 13 such that the cable output 52 of the sensor housing 34 is circumferentially located between two axial protrusions 82 of the casing. The protrusions 82 axially protrude with respect to the frontal face 13a of the casing. The protrusions 82 are spaced apart from each other in the circumferential direction. The protrusions 82 face each other. The protrusions 82 form axial lugs.

The structures illustrated in FIGS. 9 and 10 can also be described as a mechanical system that includes a fixed support part or casing 13 having an opening, for example, the opening in 13 in which the bearing outer ring 20 and a portion of the sensor housing 34 are received, and two circumferentially spaced protrusions 82 (FIG. 10) adjacent to the opening. The mechanical system also includes a sensor bearing unit 10 that extends into the opening in 13. The sensor bearing unit 10 includes a bearing 12 having a first ring 18 and a second ring 20 centered on an axis X-X and an impulse ring 14 secured to the first ring 18. The sensor bearing unit 10 also includes a sensor device 16 for detecting rotational parameters of the impulse ring 14. The sensor device 10 includes a sensor housing 34 secured to the second ring 20 of the bearing and a sensor element 36 supported in an interior of the sensor housing 34. The sensor housing 34 includes a cylindrical outer surface 43 (FIG. 10), and the cable outlet 52 is a hollow boss outside the opening that extends radially from the cylindrical outer surface 43 between the two circumferentially spaced protrusions 82.

The circumferential spacing between the protrusions 82 of the casing is sized according to the dimension of the cable output 52 of the sensor housing 34. For example, a circumferential clearance may be provided between each protrusion 82 and the cable output 52. Such clearance may be for example equal to 1 mm or 2 mm.

Since the cable output 52 of the sensor device 16 is fitted between the protrusions 82 of the non-rotating casing 13, this leads to an absolute positioning of the sensor housing 34 supporting the sensor elements 36. The cable output 52 of the sensor device 16 and the protrusions 82 of the casing also prevent a rotation of the sensor device 16 and the outer ring 20 of the bearing around the bearing axis X-X'.

This corresponds to the initial positioning of the sensor device. The speed, position and direction are detected with respect to this initial position.

As previously mentioned, in this illustrated example, the first ring of the rolling bearing is the inner rotatable ring whereas the second ring is the outer fixed ring. As an alternative, it could be possible to provide a reversed arrangement with the first ring forming the outer rotatable ring and the second ring forming the inner fixed ring. In this case, the impulse ring 14 is secured to the outer ring, and the sensor device 16 may be secured to the inner ring.

In the illustrated examples, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved sensor bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A mechanical system comprising a sensor bearing unit and a fixed support part, the sensor bearing unit comprising:
    a bearing including a first ring and a second ring centered on an axis,
    an impulse ring secured to the first ring of the bearing, and
    a sensor device for detecting rotational parameters of the impulse ring, the sensor device including a sensor housing secured to the second ring of the bearing and having a cable output,
    wherein the cable output extends radially relative to the axis and is located circumferentially between two spaced protrusions of the fixed support part.

2. The mechanical system according to claim 1, wherein the protrusions extend at least axially from the fixed support part.

3. The mechanical system according to claim 1, wherein a circumferential space between the two spaced protrusions is greater than a width of the cable output in the circumferential direction.

4. The mechanical system according to claim 1, wherein the cable output protrudes radially outwards from the sensor housing.

5. The mechanical system according to claim 1, wherein the sensor device further comprises:
    at least one sensor element supported by the sensor housing and facing the impulse ring, and
    a cable inside the cable output and operatively connected to the sensor element.

6. The mechanical system according to claim 5,
    wherein the impulse ring is made of metal and includes alternating teeth and apertures, and
    wherein the sensor element is configured to sense the metal impulse ring teeth and apertures.

7. The mechanical system according to claim 1,
    wherein the sensor housing comprises an annular axially extending outer portion, an annular axially extending inner portion and an annular radially extending portion extending between the outer portion and the inner portion.

8. The mechanical system according to claim 7, wherein the cable output protrudes radially outwards from the sensor housing.

9. The mechanical system according to claim 1, wherein the sensor housing is secured in a groove formed on a cylindrical surface of the second ring of the bearing, the groove being located radially on a side of the second ring opposite to the first ring.

10. The mechanical system according to claim 1,
    wherein the first ring is a bearing inner ring and the second ring is a bearing outer ring, and including an electrical cable extending through the cable output.

11. The mechanical system according to claim 10,
    wherein the cable output is integrally formed with the sensor housing.

12. The mechanical system according to claim 11, wherein the sensor housing is secured in a groove formed on a cylindrical surface of the bearing outer ring, the groove being located radially on a radially outer side of the bearing outer ring.

13. A method comprising:
    providing a fixed support part having an opening and two circumferentially spaced protrusions adjacent to the opening;
    providing a sensor bearing unit including a bearing having a first ring and a second ring centered on an axis, an impulse ring secured to the first ring of the bearing, and a sensor device for detecting rotational parameters of the impulse ring, the sensor device including a sensor housing secured to the second ring of the bearing and having a cable output extending radially relative to the axis, and
    inserting the sensor bearing unit into the opening with the cable output located between the two circumferentially spaced protrusions.

14. The method according to claim 13,
    including an electrical cable extending through the cable output,
    wherein the cable output comprises a hollow boss extending radially from a radial outer surface of the sensor housing, and
    wherein the second ring is a bearing outer ring.

15. The method according to claim 14,
    wherein the inserting comprises aligning the hollow boss with a gap between the two circumferentially spaced protrusions and moving the sensor bearing unit axially toward the fixed support such that at least a portion of the first ring and a portion of the second ring enter the opening and the hollow boss enters the gap.

16. The mechanical system according to claim 1,
    wherein the first ring is a bearing inner ring and the second ring is a bearing outer ring, and
    wherein at least a portion of the bearing outer ring and a portion of the sensor housing are located inside the fixed support part.

17. The mechanical system according to claim 1,
    wherein the fixed support part includes an opening adjacent to the two spaced protrusions, and
    wherein at least a portion of the first ring and a portion of the second ring are located in the opening.

18. A mechanical system comprising:
    a fixed support part having an opening and two circumferentially spaced protrusions adjacent to the opening; and
    a sensor bearing unit comprising:
        a bearing having a first ring and a second ring centered on an axis,
        an impulse ring secured to the first ring of the bearing, and
        a sensor device for detecting rotational parameters of the impulse ring,
    wherein the sensor device includes a sensor housing secured to the second ring of the bearing and a sensor element supported in an interior of the sensor housing, and
    wherein the sensor housing includes a cylindrical radially outer surface and a hollow boss outside the opening extending radially, relative to the axis, from the cylindrical outer surface between the two circumferentially spaced protrusions.

19. The mechanical system according to claim 18, wherein at least a portion of the sensor device extends into the opening.

20. The mechanical system according to claim 19, including a cable operatively connected to the sensor element and extending from the interior of the sensor housing through the hollow boss to a location outside the sensor housing.

* * * * *